Figure 1:
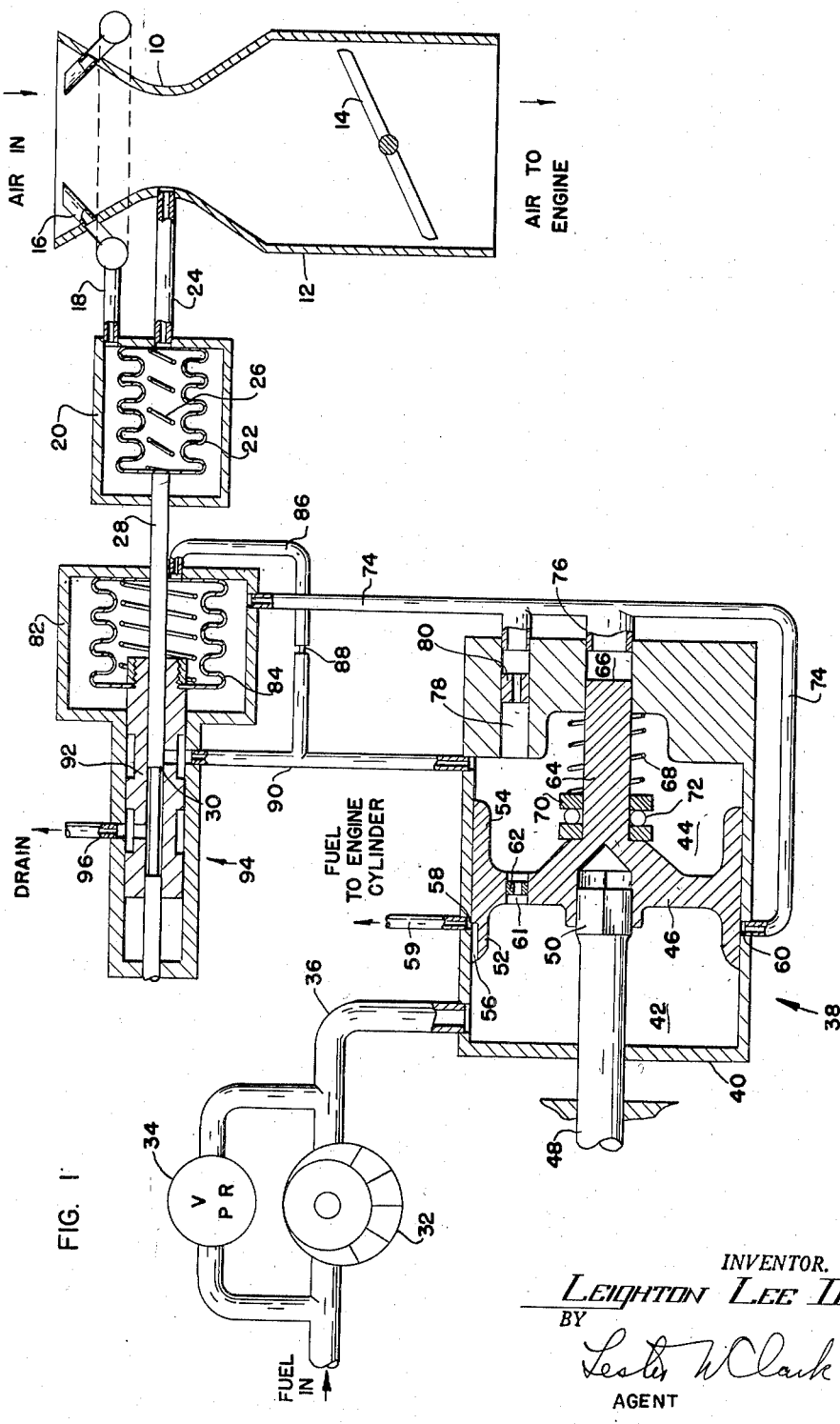

Dec. 30, 1952     L. LEE, II     2,623,539
FLUID FLOW CONTROL APPARATUS
Original Filed March 26, 1945     3 Sheets-Sheet 1

INVENTOR.
*LEIGHTON LEE II*
BY
*Lester W Clark*
AGENT

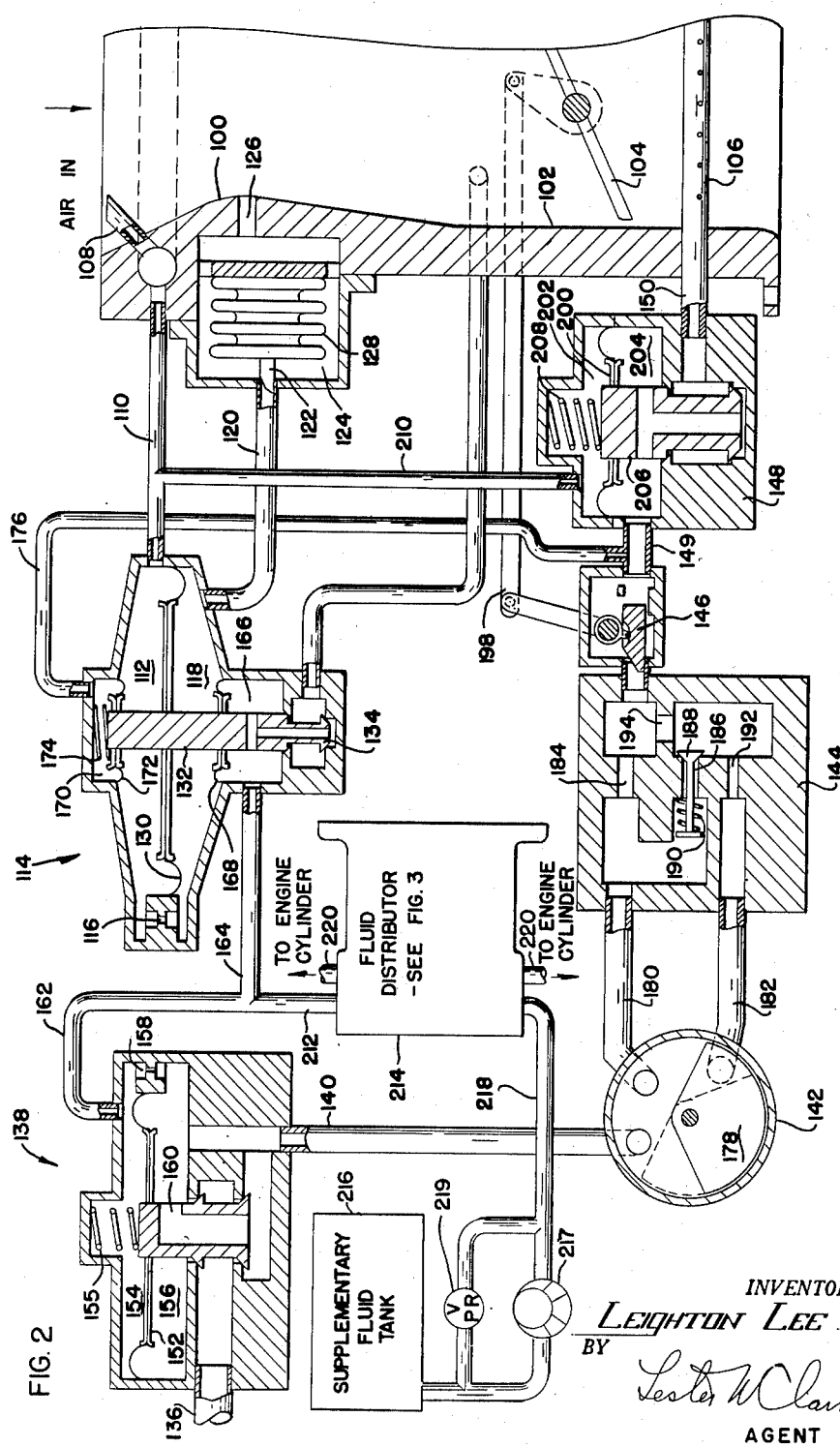

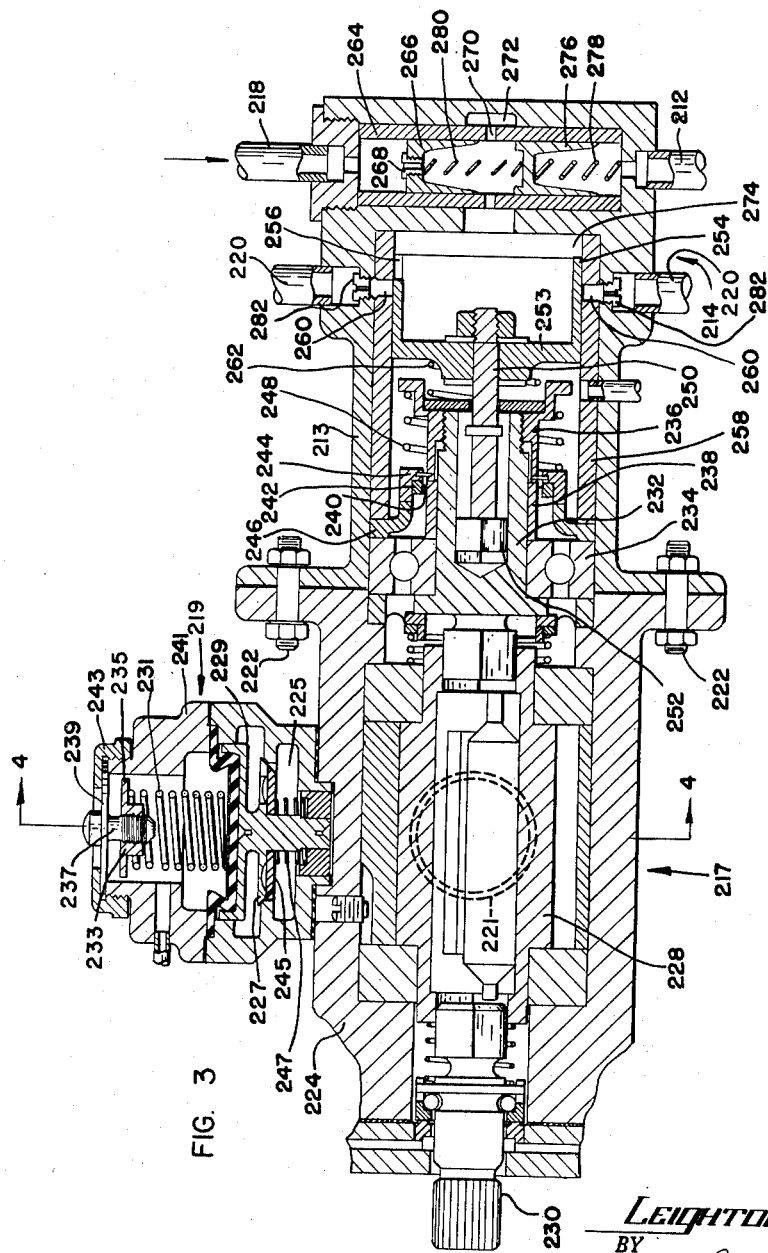

Patented Dec. 30, 1952

2,623,539

UNITED STATES PATENT OFFICE 2,623,539

FLUID FLOW CONTROL APPARATUS

Leighton Lee, II, Rocky Hill, Conn., assignor, by mesne assignments, to Niles-Bement-Pond Company, West Hartford, Conn., a corporation of New Jersey Original application March 26, 1945, Serial No. 584,867. Divided and this application October 9, 1946, Serial No. 702,215

8 Claims. (Cl. 137—487)

This application is a division of application Serial No. 584,867, filed March 26, 1945, which matured into Patent No. 2,478,288 issued August 9, 1949.

The present invention relates to fluid flow control apparatus. While my improved control apparatus is illustrated herein as applied to a fuel supply system for an internal combustion engine, it should be apparent that its utility is general and that is not limited to use in such a system.

An object of the present invention is to provide improved flow regulating apparatus.

A further object is to provide improved apparatus for regulating the fluid flow thru a conduit at a predetermined flow rate.

A further object is to provide improved apparatus for regulating the fluid flow through a conduit so as to maintain a predetermined pressure in a portion of said conduit.

Another object is to provide, in apparatus of the type described, improved means for varying the flow rate or pressure to be maintained by the apparatus.

Another object is to provide improved valve mechanism which is continuously rotated so that it may be freely translated by a small force without the possibility of sticking.

Other objects and advantages of the present invention will become apparent from a consideration of the appended specification, claims and drawings, in which Figure 1 illustrates, somewhat diagrammatically, a fuel supply system for an internal combustion engine including fuel flow regulating mechanism embodying the principles of my invention, Figure 2 illustrates a different fuel supply system to which my invention may be applied, Figure 3 illustrates a combined pump and valve mechanism suitable for use in the system of Figure 2 and embodying the principles of my invention,

Figure 1

There is illustrated in Figure 1, an air and fuel supply system for an internal combustion engine. The air flowing to the engine passes through an air induction system including a Venturi restriction 10, and a passage 12. A throttle 14, is located in the passage 12, to control the flow of air to the engine.

A pressure differential is set up between the entrance and throat of the venturi 10, which is a measure of the rate of flow of air to the engine. The total, or dynamic pressure at the air entrance is communicated through a plurality of impact tubes 16, whose open ends receive the impact of the entering air, through a passage 18 to the interior of a casing 20. A bellows 22, mounted inside the casing 20, has its interior connected thru a passage 24 to the throat of venturi 10.

The bellows 22 is therefore subjected to a difference between its internal and external pressure, which is a measure of the rate of flow of air to the engine. This pressure difference may be compensated, by any of several known devices, for changes in the density of the air flowing to the engine. For example, a density compensating mechanism such as that shown in Figure 2 may be used. Since the bellows is flexible, the position of its free end is a measure of the rate of flow of air to the engine. If desired the bellows 22 may be provided with an internal spring as shown in 26.

The free end of bellows 22 is attached to the stem 28 of a valve 30.

The fuel supply for the engine comes from a suitable tank or reservoir (not shown), and is forced to the engine by a pump 32, which is diagrammatically indicated as being of the rotary sliding vane type, and which is usually engine driven. A pressure relief valve indicated at 34 maintains a substantially constant pressure at the outlet of the pump 32 independently of the quantity of fuel pumped thereby. Fuel discharged by pump 32 passes through a conduit 36 to a fuel distributor generally indicated at 38.

The distributor 38 includes a cylindrical casing 40 whose interior is separated into two cylindrical chambers 42 and 44 by a piston 46. The piston 46 is rotated by means of a shaft 48, preferably driven by the engine. The shaft 48 is provided with a squared end 50 which mates with a square recess in the piston 46, so that the piston 46 may be translated in the cylinder 40 with respect to the shaft 48. The piston 46 is provided with skirts 52 and 54 on its opposite faces. The skirt 52 is slotted as indicated at 56 to provide fluid communication between the chamber 42 and a plurality of circumferentially spaced ports, two of which are shown at 58 and 60. A passage 61 extends through the piston 46 and provides fluid communication between the chambers 42 and 44. A fixed restriction 62 is located in the passage 61. A rod 64 extends to the right from the center of the piston 46 into a chamber 66 formed in the end of the cylinder 40. A spring 68 encircles rod 64, and is retained between the right end of cylinder 40 and a retainer 70, which is separated from the piston 76 by a suitable bearing 72. The spring 68 is under compression, so that it biases the piston 46 for movement to the left.

The number of ports 58, 60, is greater by one than the number of cylinders in the engine. Each of the ports, with the exception of port 60, is connected with a suitable injector nozzle in one of the engine cylinders. The port 60, which will be hereinafter referred to as the "sampler" port, is connected through conduits 74 and 76 to the chamber 66. The conduit 74 is also connected through a passage 78 with the chamber 44. A fixed metering restriction 80 is located in the conduit 78. The conduit 74 is also connected to the interior of a chamber 82, in which is mounted a flexible bellows 84. The interior of bellows 84 is connected through a conduit 86 having a restriction 88 therein to a conduit 90. The free end of bellows 84 is attached to a seat member 92 which cooperates with the valve 30 previously described. The conduit 90 conveys fuel from the chamber 44 in the distributor 38 to a control valve mechanism 94, which includes the valve 30 and the seat 92, previously described. The fuel passing through the valve mechanism 94 is discharged through a drain conduit 96 to the fuel tank or to the inlet of the pump 32. It may be seen that the exterior of bellows 84 is subject to the pressure upstream from restriction 80 and that the interior of bellows 84 is subject to the pressure downstream of restriction 80. The pressure differential which acts on bellows 84 and hence positions its free end, is therefore a measure of the rate of fuel flow through restriction 80.

*Operation of Figure 1*

As discussed above, the position of valve 30 is a measure of the rate of flow of air to the engine. The rate of flow of fuel to the engine is determined by the position of piston 46, since the position of that piston determines the amount of restriction of the ports 58 and 60 by the end of the slot 56. As the piston rotates, the fuel is successively distributed to the cylinders of the engine in small quantities which are determined by the position of the piston.

The position of the piston 46 in turn depends upon the difference between the pressures in chambers 42 and 44, the pressure in chamber 66, and the strength of spring 68. The pressure in chamber 42 is maintained substantially constant by the action of the pressure relief valve 34. As hereinafter explained, the pressure in chamber 66 is also maintained constant. The strength of the spring 68 can be regarded as constant, at least over the range of travel of piston 46 necessary to completely open and close the ports 58 and 60. It may therefore be seen that the position of piston 46 and hence the flow of fuel to the engine is determined chiefly by the pressure in chamber 44. The pressure in chamber 44 is in turn determined by the valve mechanism 94. The opening of the valve mechanism 94 is in turn determined by the two bellows 22 and 84. The bellows 22 operates in accordance with the rate of air flow through the passage 12 and the bellows 84 operates in accordance with the rate of fuel flow thru the restriction 80.

The rate of fuel flow through the restriction 80 is a measure of the rate of flow of fuel to the engine. It may be seen that the amount of fuel discharged through port 60 is equal to the amount of fuel discharged through each of the ports 58 connected to the engine cylinders if the pressure in the conduit 74 is equal to the pressure in the lines 59 leading to the engine cylinders. A suitable nozzle mechanism may be used at the engine cylinders which maintains the pressure in the supply lines 59 substantially constant at all times when the nozzle is open.

A change in pressure in chamber 44 tends to be transmitted through the jet 80 to chamber 66. A decrease in pressure in chamber 44 therefore tends to decrease the pressure in chamber 66. However, the decrease in pressure in chamber 44 causes a movement of piston 46 to the right, thereby increasing the effective area of the ports 58 and 60, so as to increase the pressure in chamber 66. If the restrictions 61 and 80 are properly chosen and proportioned with respect to the size of ports 58 and 60, the system may be made to maintain a substantially constant pressure in the chamber of 66, and hence in the conduit 74, for all positions of the piston 46. Furthermore, this constant pressure may be made the same as the pressure maintained in the lines 59 by the injector nozzles. If the pressure in conduit 74 is maintained equal to that of lines 59, it may be seen that the quantity of fuel flowing through the restriction 80 is proportional to, and therefore may be used as a measure of, the total quantity of fuel flowing to the engine.

The pressure in chamber 66 is given added stability by the action of that pressure on the end of the piston rod 64. It may be seen that a change in pressure in chamber 66 produces a change in the position of piston 46, so as to tend to restore the pressure in chamber 66 to its previous value. For example, an increase in pressure in chamber 66 moves the piston 46 to the left, reduces the area of the distributor ports and thereby reduces the pressure in chamber 66 to its previous value.

The valve mechanism 94 operates to control the pressure of chamber 44 so as to maintain the fuel flow through the restriction 80 proportional to the rate of flow of air to the engine. For example, if the air flow increases, the pressure differential acting to collapse bellows 22 increases, thereby moving valve 30 to the right, and opening it wider. This reduces the pressure in chamber 44, causing piston 46 to move to the right and thereby to increase the fuel flow to the engine. At the same time, the pressure drop across restriction 80 is increased, so that bellows 84 is collapsed and the seat member 92 is moved to the right to reduce the opening of valve mechanism 94. As the fuel flow increases sufficiently to balance the increased air flow, the seat member 92 reaches a position where further decrease in the pressure in chamber 44 is prevented, and the system remains balanced.

The restriction 88 in the conduit 86 operates to delay the response of the fuel flow measuring bellows 84 to changes in the fuel flow caused by a change in position of the valve mechanism 94. Therefore, an increase in the rate of air flow to the engine produces a disproportionate increase in the fuel flow, which remains temporarily out of proportion to the increase in the air flow until the pressures on the opposite sides of restriction 88 are balanced. The restriction 88 therefore serves as an acceleration responsive control device, in that it causes a disproportionate increase of the fuel flow upon acceleration of the engine. By way of example, when the air flow increases and valve 30 opens in response to the increased air flow, the pressure inside bellows 84 does not drop as fast as the pressure in conduit 90 and chamber 44, because of the action of restriction 88. Therefore, the seat member 92 remains farther to the left than it would if restriction 88 were omitted. This permits the pressure in chamber 44 to remain at a lower value, temporarily, and hence produces a faster and greater movement of piston 46. The piston 46 moves farther to the right than is necessary to rebalance the system, thereby producing a temporary enrichment of the fuel-to-air ratio. Equilibrium is gradually restored to the system after valve 30 becomes stationary, as the pressures on opposite sides of restriction 88 become equalized.

The use of the sampler principle in measuring the fuel flow makes it possible to supply the fuel to the engine cylinders with only one pressure drop in the fuel supply system up to the nozzles. Since each such pressure drop has a tendency to cause vaporization of the fuel and hence to produce inaccurate fuel metering, it may be seen that a sampler type system, such as that illustrated in Figure 1, has a considerable advantage over conventional types of fuel supply systems.

*Figures 2 and 3*

There is shown in Figure 2 a carburetor for an internal combustion engine equipped with a fluid distributor mechanism for supplying a supplementary fluid directly to the cylinders of the engine. The distributor itselfs is shown in detail in Figure 3.

In Figure 2, combustion air flowing to the engine passes through a venturi 100 and a passage 102 having a throttle 104 and a fuel discharge nozzle 106.

The air differential pressure created by the venturi 100 creates a flow of air through a secondary air passage which may be traced from impact tubes 108 through a conduit 110, a chamber 112 in a fuel meter generally indicated at 114, a restriction 116, another chamber 118, a conduit 120, past a valve 122, into a chamber 124 and thence through a conduit 126 to the throat of venturi 100. The valve 122 is positioned by a bellows 128 mounted in the chamber 124. The function of the bellows 128 and the valve 122 is to reduce the total pressure differential produced by the venturi 100 by an amount sufficient to correct for changes in the temperature and density of air, so that the pressure drop appearing across restriction 116 is a measure of the mass of air flowing through the venturi 100 per unit time. The pressure drop across restriction 116 is applied to a diaphragm 130 which separates the chambers 112 and 118. The diaphragm 130 is attached at its center to the stem 132 of a pilot valve 134.

Fuel flowing to the engine comes from a suitable pump or other source of fuel under pressure and flows through a conduit 136, a flow controlling valve 138, a conduit 140, a mixture control 142, a jet system 144, an idle valve 146, a pressure regulating valve 148, and a conduit 150 to the fuel discharge nozzle 106.

The fuel flow regulator 138 includes a diaphragm 152, separating a pair of expansible chambers 154 and 156. These chambers are connected by a restriction 158. The diaphragm 152 is attached at its center to a valve 160, which controls the flow of fuel from conduit 136 into conduit 140. The chamber 156 is connected to conduit 140. The chamber 154 is connected through conduits 162 and 164 to a chamber 166 in the fuel meter 114.

The chamber 166 is separated from chamber 118 by a flexible diaphragm 168. The fuel meter 114 also includes a chamber 170 separated from chamber 112 by a diaphragm 172. A spring 174 biases the valve 134 toward closed position. The chamber 170 is connected through a conduit 176 to the conduit 149 on the downstream side of the jet system 144.

The mixture control 142 includes a disc valve 178, movable between the position shown in full lines in the drawing, hereinafter termed its lean position, and a position shown in dotted lines in the drawing, hereinafter termed its rich position.

When the mixture control valve 178 is in its lean position, fuel can flow from the mixture control 142 to the jet system 144 only through a conduit 180. When the mixture control valve 178 is in its rich position, fuel can flow to the jet system either through a conduit 180 or through a conduit 182.

Fuel entering the jet system 144 through conduit 180 passes either through a fixed restriction 184 or through a restriction 186 controlled by an enrichment valve 188, biased to closed position by a spring 190. Fuel flowing to the jet system 144 through conduit 182 passes through a fixed restriction 192. Fuel flowing through the restrictions 186 and 192 also flows through a restriction 194.

The idle valve 146 is normally open, but moves toward its closed position as the throttle moves into a range of positions adjacent its closed position, so as to regulate the fuel flow. At such times, the air pressure differential set up by the venturi is an unreliable indication of the air flow. Therefore, it is considered better to increase the opening of valve 160 disproportionately to the air pressure differential set up by the venturi, and to regulate the fuel flow by means of the idle valve 146, which is connected to the throttle by means of a link 196. The disproportionate increase in the opening of valve 160 is secured by the use of the springs 155 and 174, on valve 160 and pilot valve 134 respectively, which bias their associated valves in a direction to increase the fuel flow through the valve 160.

The pressure regulator 148 includes a diaphragm 200 separating a pair of expansible chambers 202 and 204. The diaphragm 200 is attached at its center to a valve 206. A spring 208 biases the valve 206 toward closed position. The chamber 204 receives fuel from conduit 149. The chamber 202 is connected through a conduit 210 to the conduit 110.

The conduit 162 is connected through a conduit 212 to a fluid distributing and regulating mechanism illustrated in detail in Figure 3. The distributor 214 receives fluid to be distributed to the cylinders of the engine from a tank 216 thru a pump 217 and a conduit 218. A pressure relief valve 219 is provided to maintain a substantially constant discharge pressure at the pump 217. The distributor 214 distributes the fluid to lines 220 leading to the respective engine cylinders, in quantities determined by the pressure in conduit 212.

The pump 217 and the distributor 214, which are shown diagrammatically in Figure 2, are set forth in detail in Figure 3. The distributor 214 is built in a housing 213 attached by means of bolts 222 to a housing 224 containing the pump 217, of generally conventional design. The pump 217 includes a rotor 228 driven by a shaft 230, which is splined at its end so that it may be readily driven thru a suitable connection from the engine.

The pump receives fluid thru an inlet connection 221 and discharges it thru an outlet on the opposite side of the rotor 228. The pump discharge pressure is regulated by a relief valve generally indicated at 219. Fluid at the pump discharge pressure flows into a relief passage 225, where it acts upwardly on the under side of a valve 227. The upper surface of valve 227 is attached to a guide 229. The guide 229 and valve 227 are biased in a valve closing direction by a spring 231. The upper end of spring 231 acts against a retainer nut 233, which is held against rotation by diametrically opposite projections 235, which slide in grooves in the valve cover 241. The nut 233 is vertically adjustable to vary the spring tension by means of a screw 237 on which the nut 233 is threaded. The screw 237 is provided with a flange 239 which may be clamped between the valve cover 241 and a locking cap 243 to hold the nut 233 in any adjusted position. The valve 227 and guide 229 are balanced against pump inlet pressure.

A by-pass valve 245 is provided in the form of a thin disk biased upwardly against the under side of valve 227 by means of a spring 247. The disk valve 245 closed apertures in the valve 227. If for any reason the pump inlet pressure becomes greater than the discharge pressure, the valve 245 opens, allowing fluid to by-pass the pump. This arrangement is useful when two pumps are connected in series in a fluid line. If one pump fails to operate for some reason, the by-pass valve on that pump opens to allow the other pump to move fuel past it.

If the pump discharge pressure tends to increase above the value established by the force of spring 231, the relief valve opens, allowing part of the fuel discharged to return to the pump inlet. The valve continues to open wider until the pump discharge pressure is reduced to a value which just balances the force of spring 231. Therefore the pump discharge pressure is held at a substantially constant value.

The opposite end of rotor 228 is drivingly connected to a shaft 232, which turns in a bearing 234 in the housing 213. A collar 236 is threaded on the right end of shaft 232. Another collar 238 surrounds the shaft 232 between collar 236 and bearing 234. A flexible diaphragm 240 is clamped between the collars 236 and 238. The outer edge of diaphragm 240 is clamped between a pair of rings 242 and 244, which are press fitted together in nesting relationship. The left end of the ring 224 has a sliding contact with a stationary seal ring 246. The diaphragm 240, and the running seal together prevent leakage of fluid along the outside of shaft 232. A spring 248 is retained between the collar 236 and the ring 244 to maintain the running seal surfaces in engagement.

A piston rod 250 is provided with a squared end 252 slidable in a square recess at the axis of shaft 232. The other end of rod 250 is attached to a piston 253. The rod 250—252 and the piston 253 continuously rotate with the shaft 232. The piston 253 is provided with a skirt 254 which is slotted, as at 256, to provide fluid communication between the chamber 274 at the right end of piston 253 and a plurality of ports 260 which extend through to the wall of the cylinder 253 in which the piston 253 rotates.

A spring 262 retained between the collar 236 and the piston 252 biases the latter for movement to the right, in a direction such that the end of the slot 256 ends to close the ports 260.

Fluid entering the distributor 214 for distribution thereby passes from conduit 218 into a cylinder 264. A piston 266 is movable within the cylinder 264. A fixed restriction 268 provides fluid communication between the opposite sides of the piston. The lower edge of the piston 266 serves as a valve to control the area of a number of ports 270. The ports 270 pass through the walls of the cylinder 264 and lead to a recess 272 which communicates with the chamber 274 on the right hand side of piston 253.

Another piston 276 is located in the cylinder 264. The piston 276 is biased upwardly by a spring 278. Another spring 280 is retained between the upper surface of the piston 276 and the lower surface of the piston 266. The space under the piston 276 is subject to the pressure in the conduit 212, to which it is connected.

It may be seen that fluid entering the distributor 214 flows through conduit 218, cylinder 264, restriction 268, ports 270, recess 272, chamber 274, and out through the ports 260 to the respective cylinders of the engine. The quantity of fluid discharged through the ports 260 depends upon the pressure available in the chamber 274 to act on the piston 252 and compress the spring 262. That pressure is controlled by the piston 266 which acts as a valve to control the area of the ports 270. The piston 266 is positioned by the pressure drop across restriction 268, which pressure drop is opposed by spring 280. The pressure drop across restriction 268 is a measure of the rate of flow of fluid through that restriction. For any given setting of the spring 280 the piston 266 will assume a position where the fluid flow through restriction 268 and ports 270 is just enough so that the pressure drop across restriction 268 balances the force of spring 280. The force of spring 280 and hence the rate of flow of fluid through the distributor 214 is determined by the pressure in conduit 212, which acts on the piston 276 to set the position of the lower end of spring 280. The amount of fluid discharged to the engine by the distributing mechanism 214 is therefore proportional to the pressure in conduit 212.

A restriction 282 is shown in each of the ports 260. These restrictions are removable, and may be utilized to increase the amount of fluid flow to one or more of the cylinders relative to the amount supplied to the other cylinders. It has been found that in a modern aircraft engine having a large number of cylinders, certain cylinders tend to run hot, either because of uneven cooling or because of the uneven fuel distribution to the cylinders. When this condition occurs the mechanism shown may be utilized to supply an additional amount of fluid to the cylinders which are running hot.

It is well known that an increase in the richness of the fuel and air mixture supplied to an engine will make the mixture burn at a lower temperature, and hence will lower the engine temperature. When the distributor is used to distribute fuel, the tank 216 may be one of the regular fuel tanks, or conduit 218 may be connected directly to conduit 136. Pump 217 may then be the usual engine fuel pump.

The device shown in Figure 3 may alternatively be used to supply an antiknock fluid of some kind to the cylinders of the engine. For example, the fluid may be water or a water and alcohol mixture.

*Operation of Figures 2 and 3*

The pressure in chamber 154 of the fuel flow regulator 138 is a measure of the pressure in chamber 156, since the difference between these two pressures is the force of spring 155 which may be considered as being constant without appreciable error.

The pressure drop across the jet system 144 may be taken as a measure of flow of fuel to the engine, as long as the area of the metering restriction open to the flow of fuel remains constant. Since the pressure on the downstream of the jet system is maintained substantially constant by the regulator 148, the pressure on the upstream side of the jet system may itself be used as a measure of the fuel flow. Furthermore, as set forth above, the pressure in chamber 154 is a measure of the pressure in chamber 156, which is substantially the same as the pressure on upstream side of the jet system. Therefore the pressure of chamber 154 may be used as a measure of the rate of fuel flow to the engine. The pressure of chamber 154 is transmitted through conduits 162 and 164 to chamber 166 in the fuel meter 114.

The valve 134 in the fuel meter 114 is positioned in accordance with the difference between two pressure differentials. The air pressure differential acting downwardly on diaphragm 130 is a measure of the rate of flow of air to the engine, and the fuel pressure differential between chambers 166 and 170, which acts upwardly on the valve 134, and is a measure of the rate of fuel flow to the engine. The position of valve 134 determines the pressure in chamber 166 and hence the pressure in chamber 154 and thereby the rate of fuel flow. It may therefore be seen that the fuel meter 114 acts to maintain a constant ratio between the fuel flow and the air flow. This ratio may, of course, be varied by operation of the mixture control valve 178, or by opening of enrichment valve 188, which occurs at high fuel pressure differentials. Furthermore, since the fuel pressure in conduit 212 and conduit 162 is communicated through conduit 212 to the fluid distributor 214, it may be seen that the amount of fluid distributed directly to the cylinders is maintained proportional to the rate of flow of air to the engine, and hence, for a given open area of the fuel metering restriction, proportional to the rate of flow of fuel to the engine.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Fluid flow control apparatus comprising: a fluid conduit including a cylinder having closed ends, a piston in said cylinder, a portion of said conduit being formed by a passage including a fixed metering restriction connecting the opposite sides of said piston; means, connected to said passage and operable in response to the pressure drop across said restriction, for controlling the fluid pressure in said cylinder downstream of said restriction; a port through a lateral wall of said cylinder, communicating with said passage and cooperating with said piston so that the area of said port is varied by the translation of said piston, for controlling the fluid flow through said conduit; said piston being movable, in response to changes in the fluid pressure differential across said restriction caused by changes in fluid flow therethrough, in a sense to vary the area of said port so as to restore said pressure differential to its previous value and thereby maintain the flow through said restriction substantially constant; and means for applying a force to said piston in opposition to said pressure differential to determine the rate of flow maintained thereby.

2. Fluid flow control apparatus comprising: a fluid conduit including a cylinder having closed ends, a piston in said cylinder, a portion of said conduit being formed by a passage including a fixed metering restriction connecting the opposite sides of said piston; means, connected to said passage and operable in response to the pressure drop across said restriction, for controlling the fluid pressure in said cylinder downstream of said restriction; a port through a lateral wall of said cylinder communicating with said passage and cooperating with said piston so that the area of said port is varied by the translation of said piston, for controlling the fluid flow through said conduit; said piston being movable, in response to changes in the fluid pressure differential across said restriction caused by changes in fluid flow therethrough, in a sense to vary the area of said port so as to restore said pressure differential to its previous value and thereby maintain the flow through said restriction substantially constant.

3. Fluid flow control apparatus comprising: a fluid conduit including a cylinder having closed ends, a piston in said cylinder, a portion of said conduit being formed by a passage including a fixed metering restriction connecting the opposite sides of said piston; means, connected to said passage and operable in response to the pressure drop across said restriction, for controlling the fluid pressure in said cylinder downstream of said restriction; a port through a lateral wall of said cylinder, communicating with said passage and cooperating with said piston so that the area of said port is varied by the translation of said piston, for controlling the fluid flow through said conduit; said piston being movable, in response to changes in the fluid pressure differential across said restriction caused by changes in fluid flow therethrough, in a sense to vary the area of said port so as to restore said pressure differential to its previous value and thereby maintain the flow through said restriction substantially constant; spring means acting on said piston in opposition to said pressure differential, and means for variably supplementing the force of said spring means, and hence varying said pressure differential to control the flow through said conduit.

4. A valve mechanism comprising: a cylinder having closed ends, a piston rotatably and translatably mounted in said cylinder and separating two expansible pressure chambers formed between the faces of said piston and the ends of said cylinder, a plurality of discharge ports through the cylindrical wall of one of said chambers, said piston being adapted upon rotation to intermittently and successively open and close said ports and upon translation to vary the opening of said ports, means for supplying fluid under constant pressure to said one chamber, means for applying a variable fluid pressure to the other of said chambers to cause translation of said piston, thereby varying the openings through said ports and thus control the flow of fluid therethrough in accordance with said variable fluid pressure.

5. A valve mechanism according to claim 4, wherein the difference in the pressures in said chambers acts to translate said piston in a direction to open said ports, including means for applying to said piston a force biasing it in a direction to close said ports, and means for varying the force acting on at least one face of said piston to cause translation thereof and thereby control the opening of said ports.

6. A valve mechanism according to claim 4, including means for continuously rotating said piston to intermittently and successively open and close said ports and also prevent sticking of said piston.

7. A valve mechanism according to claim 4, wherein said piston is provided on one face with an annular skirt adapted upon translation and rotation of said piston to intermittently and successively open and close said ports and upon translation of said piston to vary the openings of said ports.

8. A valve mechanism comprising: a cylinder having closed ends, a piston rotatably and translatably mounted in said cylinder and separating two expansible chambers formed between the faces of said piston and the ends of said cylinder, a plurality of discharge ports through the cylindrical wall of one of said chambers, said piston being adapted upon rotation to intermittently and successively open and close said ports and upon translation to vary the opening of said ports; means for supplying fluid under a controlled pressure to said one chamber to cause translation of said piston in a direction to open said ports, and means for applying to said piston a force biasing it in a direction to close said ports; and means for varying the difference between the forces acting on said piston to vary the opening through said ports and thus control the flow of fluid therethrough in accordance with said difference.

LEIGHTON LEE, II.

REFERENCES CITED

The following references are of record in the file of this patent:

UNITED STATES PATENTS

| Number | Name | Date |
|---|---|---|
| Re. 21,892 | Hogg | Sept. 2, 1941 |
| 1,957,044 | Johansson | May 1, 1934 |
| 2,306,379 | Conradson | Dec. 29, 1942 |
| 2,402,350 | Silver | June 18, 1946 |

FOREIGN PATENTS

| Number | Country | Date |
|---|---|---|
| 15,962 | Great Britain | of 1914 |